UNITED STATES PATENT OFFICE.

HAROLD G. UNDERWOOD, OF MILWAUKEE, WISCONSIN, ASSIGNOR TO TH
AVERY LACTATE COMPANY, OF PORTSMOUTH, NEW HAMPSHIRE.

LACTATE BAKING-POWDER.

SPECIFICATION forming part of Letters Patent No. 328,364, dated October 13, 1885.

Application filed April 27, 1885. Serial No. 163,641. (No specimens.)

*To all whom it may concern:*

Be it known that I, HAROLD G. UNDERWOOD, of Milwaukee, in the county of Milwaukee, and in the State of Wisconsin, have invented certain new and useful Improvements in Baking-Powders; and I do hereby declare that the following is a full, clear, and exact description thereof.

My invention relates to the raising of bread by the reaction of the acid lactates (especially the acid lactate of calcium) on the carbonates or bicarbonates of the alkaline earths, particularly of lime and magnesia.

In carrying out my invention the acid lactate and the described carbonates or bicarbonates may be previously mixed together and added in suitable quantity to the flour; or they may be separately mixed with the flour, when required.

If the mixture of acid lactate and the carbonates or bicarbonates of the alkaline earths is to be kept for any length of time before using, a proper dividing agent—such as starch, dry and powdered, or rice-flour—is preferably mixed with it, to prevent change and loss of strength. The change may also be retarded if the acid lactate is itself dehydrated and deprived of the water of crystallization. The mixture may be effected by sifting, trituration, or any other well-known means for mixing powders.

In using the acid lactate of calcium for raising bread it is not absolutely necessary that it should be entirely free from neutral lactate of calcium or free lactic acid, and it will serve the purpose even if some impurities—such as small quantities of butyric acid or butyrates—are allowed to remain; but, when readily obtainable, I use the acid lactate in a practically pure condition.

Although I do not confine myself to the following proportions, I regard the following as a satisfactory formula in ordinary cases in making bread: Take about six thousand parts, by weight, of flour and add thereto one hundred parts, by weight, of the dry pulverized lactate and about forty parts, by weight, of the carbonate of lime or magnesia. If the bicarbonate instead of the carbonate of magnesia is used, I modify the proportions of the ingredients—say, using about one hundred parts of the lactate to about eighty-four parts of the bicarbonate of magnesia, for instanc The mixture of flour, acid lactate, and the ca bonates or bicarbonates described is then sal ed, if desired, (adding, say, five to fifte( parts of salt to each one thousand parts of tl mixture,) and five hundred parts (more less) of water (all proportions being by weigh mixed therewith, and the mass well kneade molded, and baked. The carbonic-acid g necessary to raise the bread is evolved at tl right time, and the reaction is so comple that the alkali is neutralized and not left fr to injure the bread.

In putting up the baking-powder for futu use 1 would ordinarily employ to each hu dred parts of the dry pulverized lactate abo forty parts of the carbonate of lime (more less) or magnesia and about ten to fifte( parts of dry and powdered starch, rice-flou or other suitable farinaceous or other dividi agent; or if the bicarbonate of magnesia used, a chemically-equivalent proportion m; be used, as hereinbefore indicated, and som what less of the dividing agent than before.

The foregoing proportions may be vari( within reasonable limits without departi from the spirit of my invention, and I do n confine myself strictly thereto. In place the acid lactate of calcium other suitable ac lactates may be taken; but I prefer the ca cium lactate, as it may be readily and cheap made by the well-known Avery processes.

Having thus described my invention, whal claim as new, and desire to secure by Lette Patent, is—

1. The improved baking-powder or crear of-tartar substitute herein described, consis ing of an acid lactate combined with the ca bonates or bicarbonates of the alkaline earth as set forth.

2. A baking-powder consisting of the ac lactate of calcium, the carbonates of lime magnesia, and a suitable dividing agent, as s forth.

In testimony that I claim the foregoing have hereunto set my hand, at Washington, the District of Columbia, in the presence two witnesses.

HAROLD G. UNDERWOOD.

Witnesses:
ARCHIBALD YOUNG,
C. M. WERLE.